(12) United States Patent
Kwon (10) Patent No.: US 9,475,451 B2
(45) Date of Patent: Oct. 25, 2016

(54) AIRBAG APPARATUS

(71) Applicant: HYUNDAI MOBIS Co., Ltd., Yongin-si, Gyeonggi-do (KR)

(72) Inventor: Hae Wook Kwon, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/823,022

(22) Filed: Aug. 11, 2015

(65) Prior Publication Data

US 2016/0046255 A1   Feb. 18, 2016

(30) Foreign Application Priority Data

Aug. 14, 2014 (KR) .................. 10-2014-0106196

(51) Int. Cl.
*B60R 21/233* (2006.01)
*B60R 21/239* (2006.01)
*B60R 21/2338* (2011.01)

(52) U.S. Cl.
CPC .......... *B60R 21/233* (2013.01); *B60R 21/239* (2013.01); *B60R 2021/23324* (2013.01); *B60R 2021/23384* (2013.01)

(58) Field of Classification Search
CPC ............. B60R 21/233; B60R 21/239; B60R 2021/23308; B60R 2021/23324; B60R 2021/23384; B60R 2021/23332; B60R 2021/23316
See application file for complete search history.

(56) References Cited

U.S. PATENT DOCUMENTS

| | | | |
|---|---|---|---|
| 9,272,684 B1* | 3/2016 | Keyser | B60R 21/237 |
| 2011/0241322 A1* | 10/2011 | Nozaki | B60R 21/23138 |
| | | | 280/730.2 |
| 2012/0013106 A1* | 1/2012 | Sato | B60R 21/205 |
| | | | 280/729 |
| 2015/0258958 A1* | 9/2015 | Belwafa | B60R 21/233 |
| | | | 280/729 |
| 2015/0298643 A1* | 10/2015 | Schneider | B60R 21/233 |
| | | | 280/729 |
| 2015/0343986 A1* | 12/2015 | Schneider | B60R 21/205 |
| | | | 280/729 |
| 2016/0046257 A1* | 2/2016 | Yamada | B60R 21/2338 |
| | | | 280/729 |
| 2016/0059817 A1* | 3/2016 | Umehara | B60R 21/233 |
| | | | 280/729 |

* cited by examiner

*Primary Examiner* — Drew Brown
(74) *Attorney, Agent, or Firm* — Paratus Law Group, PLLC (57) ABSTRACT

Disclosed is and airbag apparatus including an inflator which generates gas; an airbag which has a first expandable portion that is coupled to the inflator and inflated when gas flows into the first expandable portion, and a second expandable portion that is inflated by gas discharged from the first expandable portion; and a partition wall which is disposed in the airbag to divide the airbag in a left and right direction into the first expandable portion and the second expandable portion, and has a communicating hole through which gas in the first expandable portion is discharged into the second expandable portion.

11 Claims, 10 Drawing Sheets

AIRBAG APPARATUS

CROSS-REFERENCE TO RELATED APPLICATIONS

The present application claims priority to Korean Patent Application Number 10-2014-0106196 filed Aug. 14, 2014, the entire contents of which the application is incorporated herein for all purposes by this reference.

TECHNICAL FIELD

The present invention relates to an airbag apparatus, and more particularly, to an airbag apparatus that protects an occupant seated in a front passenger seat.

BACKGROUND

In general, various types of safety devices are provided in a vehicle in order to protect occupants seated in seats, and an airbag is provided as a representative safety device.

The airbag is designed so that the airbag is deployed by pressure at which an adult person having typical weight (for example, 65 kg) may be protected.

Meanwhile, while usually adult persons having typical weight are seated in the driver seat, various occupants such as infants, children, and adult persons having weight lower than the typical weight as well as adult persons having typical weight are seated in a front passenger seat.

Therefore, in the case of the airbag for a front passenger seat, it is necessary to vary deployment pressure in accordance with the type of occupant. In order to vary deployment pressure in accordance with the type of occupant, a method of adjusting an amount of gas discharged from the airbag and a method of installing a sub-cushion having a separate chamber in the airbag are used for the airbag for a front passenger seat.

In the case of the airbag for a front passenger seat, when a vehicle collides with an object obliquely with respect to a direction in which the vehicle travels instead of undergoing a head-on collision, there is a problem in that even though the deployment pressure is adjusted as described above, a head of the passenger deviates from the airbag and moves forward while sliding toward one side of the airbag after coming into contact with the airbag, and then collides with a structure of the vehicle.

SUMMARY

The present invention has been made in an effort to provide an airbag apparatus capable of protecting an occupant even though a vehicle collides with an object obliquely with respect to a direction in which the vehicle travels.

Technical problems of the present invention are not limited to the aforementioned technical problem, and other technical problems, which are not mentioned above, may be clearly understood by those skilled in the art from the following descriptions.

An exemplary embodiment of the present invention provides an airbag apparatus including: an inflator which generates gas; an airbag which has a first expandable portion that is coupled to the inflator and inflated when gas flows into the first expandable portion, and a second expandable portion that is inflated by gas discharged from the first expandable portion; and a partition wall which is disposed in the airbag to divide the airbag in a left and right direction into the first expandable portion and the second expandable portion, and has a communicating hole through which gas in the first expandable portion is discharged into the second expandable portion.

Other detailed matters of the exemplary embodiment are included in the detailed description and the drawings.

According to the airbag apparatus according to the exemplary embodiments of the present invention, when the vehicle collides with an object at the front side with respect to a direction in which the vehicle travels, the upper body of the occupant is protected while coming into contact with the first expandable portion of the airbag. In addition, in a case in which the vehicle collides with an object obliquely with respect to the direction in which the vehicle travels, the upper body of the occupant comes into contact with the first expandable portion of the airbag and then comes into contact with the second expandable portion of the airbag while sliding toward one side, and as a result, the upper body of the occupant does not deviate from the airbag.

The effect of the present invention is not limited to the aforementioned effect, and other effects, which are not mentioned above, will be clearly understood by those skilled in the art from the claims.

DETAILED DESCRIPTION

Advantages and features of the present invention and methods of achieving the advantages and features will be clear with reference to exemplary embodiments described in detail below together with the accompanying drawings. However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, an airbag apparatus according to exemplary embodiments of the present invention will be described with reference to the drawings.

Figure 1:
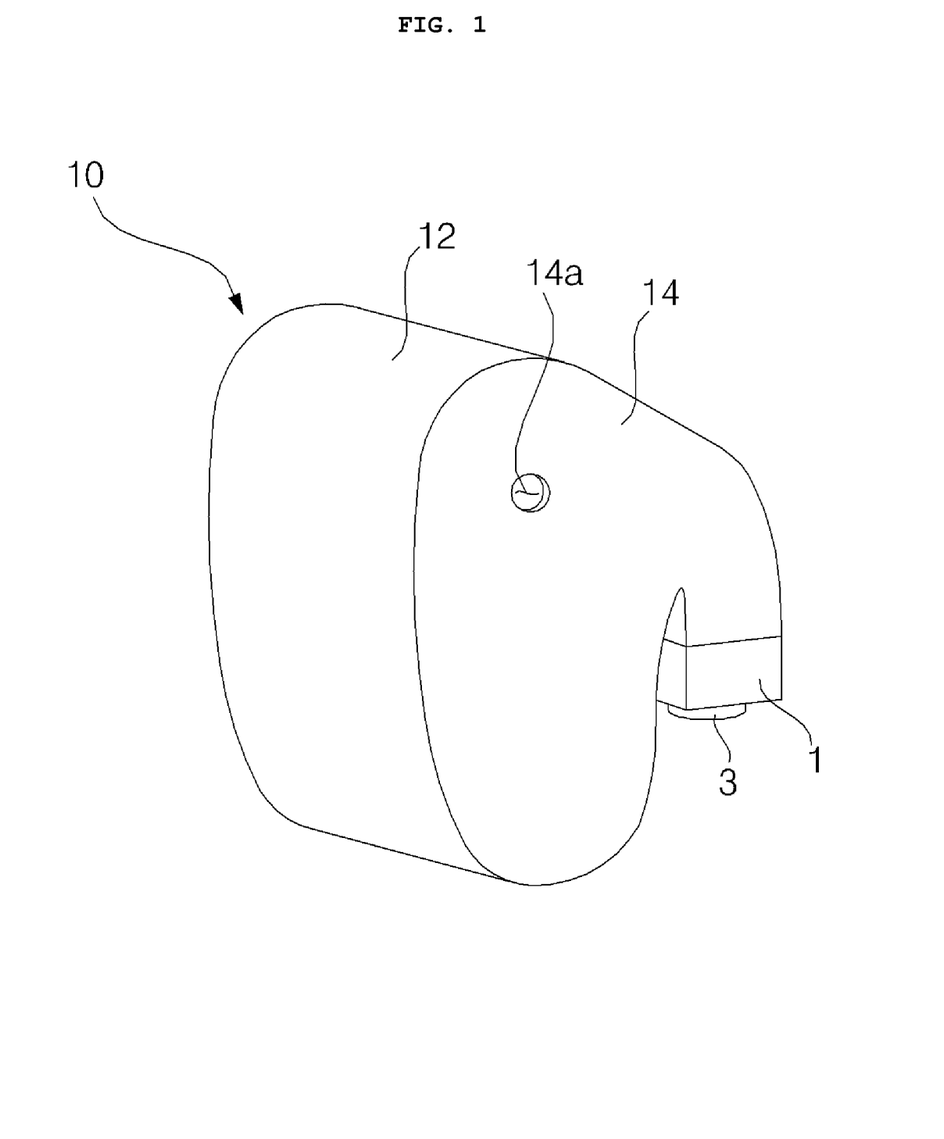
FIG. 1 is a perspective view illustrating an airbag apparatus according to a first exemplary embodiment of the present invention.

FIG. 1 is a perspective view illustrating an airbag apparatus according to a first exemplary embodiment of the present invention.

Referring to FIG. 1, the airbag apparatus according to the first exemplary embodiment of the present invention includes an airbag housing 1, an inflator 3, and an airbag 10.

The airbag housing 1 is coupled to the inflator 3 and the airbag 10 and mounted to a vehicle body. The airbag housing 1 is opened at an upper end thereof, and has a vacant space formed therein, and the vacant internal space is an accommodating space that may accommodate the airbag.

At the time of a vehicle accident, the inflator 3 generates gas according to a control signal from a controller and injects the gas into the airbag 10. The interior of the inflator 3 is filled with a gas generating medium that is ignited to generate gas while exploding by the control signal from the controller.

A head portion of the inflator 3 through which gas is injected is inserted into the airbag housing 1 from a lower side of the airbag housing 1 and then inserted into the airbag 10. Therefore, when the inflator 3 generates gas, the airbag 10 is inflated as gas injected by the inflator 3 flows into the airbag 10.

The airbag 10 is folded and accommodated in the airbag housing 1, and when gas generated by the inflator 3 flows into the airbag 10, the airbag 10 is inflated and deployed toward an occupant while coming out of the airbag housing 1 through the opened upper end of the airbag housing 1.

The airbag 10 is manufactured by coupling three panels made of a flexible material by sewing. That is, the airbag 10 includes a main panel 12 which is disposed at a center of the airbag 10, and two side panels 14 which are coupled to both sides of the main panel 12, respectively. When the airbag 10 is inflated, the occupant comes into contact with the main panel 12. That is, the main panel 12 defines a front surface of the airbag 10 with which the occupant comes into contact, and the two side panels 14 define both lateral surfaces of the airbag 10.

Figure 2:
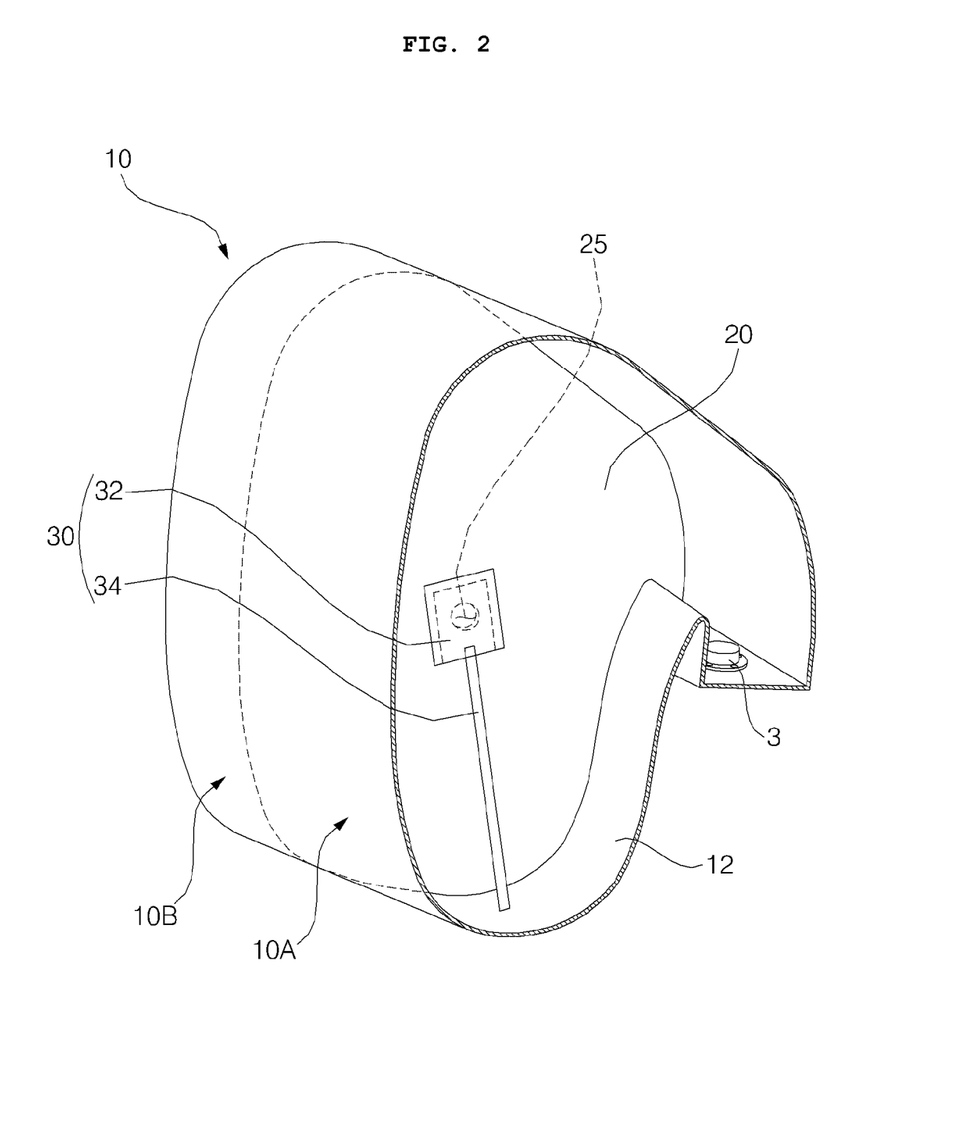
FIG. 2 is a cut-away perspective view illustrating a state in which one side of an airbag illustrated in FIG. 1 is cut out.

FIG. 2 is a cut-away perspective view illustrating a state in which one side of the airbag illustrated in FIG. 1 is cut out.

Referring to FIG. 2, a partition wall 20, which divides an internal space of the airbag 10 in a left and right direction, is disposed in the airbag 10. The partition wall 20 is disposed between the two side panels 14, and a circumference of the partition wall 20 is coupled to an inner surface of the main panel 12, thereby dividing the airbag 10 in the left and right direction.

As the airbag 10 is divided in the left and right direction by the partition wall 20, a first expandable portion 10A is formed at the right side based on the partition wall 20, and a second expandable portion 10B is formed at the left side based on the partition wall 20.

The head portion of the inflator 3 is inserted into the first expandable portion 10A. Therefore, the first expandable portion 10A is inflated when gas generated by the inflator 3 flows into the first expandable portion 10A. Further, a communicating hole 25 through which gas in the first expandable portion 10A is discharged into the second expandable portion 10B is formed in the partition wall 20. Therefore, the second expandable portion 10B is inflated by gas that is discharged through the communicating hole 25 from the first expandable portion 10A.

The first expandable portion 10A is disposed to be closer to the outside from the interior of the vehicle between the left and right sides than the second expandable portion 10B. For example, in a case in which the airbag 10 is installed in front of a right seat, the first expandable portion 10A is disposed at the right side of the second expandable portion 10B, and the second expandable portion 10B is disposed at the left side of the first expandable portion 10A. In addition, in a case in which the airbag 10 is installed in front of a left seat, the first expandable portion 10A is disposed at the left side of the second expandable portion 10B, and the second expandable portion 10B is disposed at the right side of the first expandable portion 10A. In addition, the first expandable portion 10A is disposed at a position corresponding to the occupant. That is, in a case in which the vehicle collides with an object at the front side with respect to a direction in which the vehicle travels and the airbag 10 is inflated, an upper body of the occupant is protected while coming into contact with the first expandable portion 10A. Further, in a case in which the vehicle collides with an object obliquely with respect to the direction in which the vehicle travels and the airbag 10 is inflated, the upper body of the occupant comes into contact with the first expandable portion 10A, and then comes into contact with the second expandable portion 10B while sliding toward one side of the airbag. Therefore, the second expandable portion 10B prevents the upper body of the occupant from moving forward, and as a result, it is possible to prevent the upper body of the occupant from moving forward and deviating from the airbag 10, thereby preventing the upper body of the occupant from colliding with a hard structure of the vehicle.

A vent rate adjusting member 30 is disposed in the first expandable portion 10A. The vent rate adjusting member 30 shields the communicating hole 25 formed in the partition wall 20, and while the first expandable portion 10A is being inflated, the vent rate adjusting member 30 gradually opens the communicating hole 25.

At the initial time when the inflator 3 begins to inject gas into the first expandable portion 10A, the vent rate adjusting member 30 shields the communicating hole 25 so that the first expandable portion 10A may be quickly inflated, and while the first expandable portion 10A is being inflated, the vent rate adjusting member 30 gradually opens the communicating hole 25 so that the second expandable portion 10B may be inflated by gas that is discharged through the communicating hole 25 from the first expandable portion 10A.

The vent rate adjusting member 30 includes a vent cover 32 which shields the communicating hole 25 and has at least one end coupled to the partition wall 20, and a tether 34 which is coupled to the vent cover 32 and the first expandable portion 10A.

The vent cover 32 is formed as a quadrangular plate having an area enough to shield the communicating hole 25. The vent cover 32 may be changed to have various shapes in addition to the quadrangular shape as long as the vent cover 32 has an area enough to shield the communicating hole 25.

One end of the tether 34 is coupled to a lower end of the vent cover 32, and the other end of the tether 34 is coupled to the main panel 12, that is, a lower surface in the first expandable portion 10A. The tether 34 is in a loosened state, and thereafter, as the first expandable portion 10A is inflated, the tether 34 becomes tightened and pulls the vent cover 32 so that the vent cover 32 may open the communicating hole 25.

Figure 3:
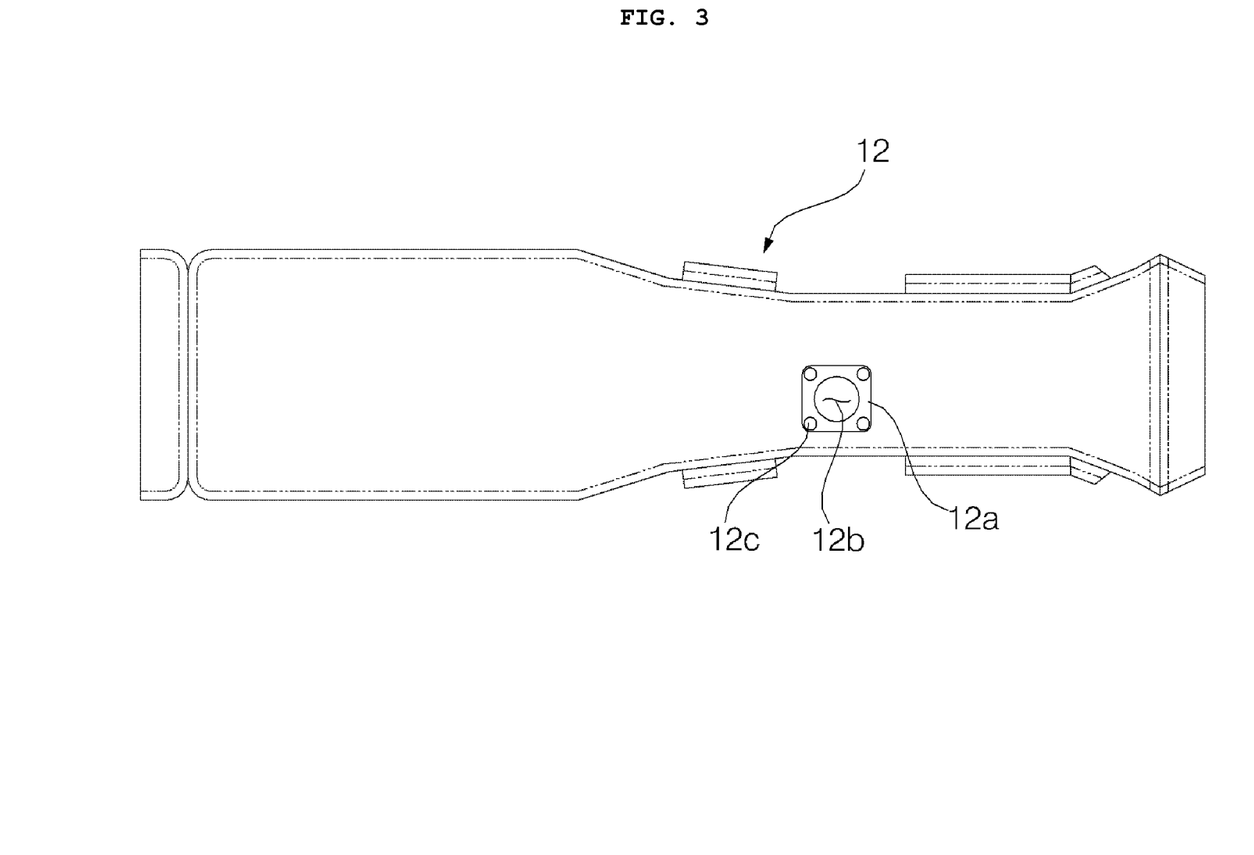
FIG. 3 is a view illustrating a state in which a main panel illustrated in FIG. 1 is spread out before the airbag is manufactured by using the main panel.

FIG. 3 is a view illustrating a state in which the main panel illustrated in FIG. 1 is spread out before the airbag is manufactured by using the main panel.

Referring to FIG. 3, before the airbag 10 is manufactured by using the main panel 12, the main panel 12 is formed to be elongated in the left and right direction based on the drawing. When the main panel 12 is spread out as illustrated in FIG. 3, and then the circumference of the partition wall 20 is coupled to the main panel 12 by sewing, the main panel 12 has an annular shape that is opened at upper and lower ends thereof. In this case, the left and right ends of the main panel 12 are in direct contact with each other. Therefore, the left and right ends of the main panel 12, which are in direct contact with each other, are coupled to each other by sewing, and then the circumferences of the side panels 14 are coupled to the opened upper and lower ends of the main panel 12 by sewing, respectively, such that the airbag 10 is completely manufactured.

An inflator insertion hole 12b into which the head portion of the inflator 3 is inserted formed in a portion of the main panel 12 which corresponds to the first expandable portion 10A. A rigid retainer 12a is disposed at the periphery of the inflator insertion hole 12b in the main panel 12. Fastening holes 12c are formed at corners of the retainer 12a. The head portion of the inflator 3 is inserted into the airbag housing 1 from a lower side of the airbag housing 1 and then inserted into the inflator insertion hole 12b, and bolts (not illustrated) are inserted into the fastening holes 12c to fasten the retainer 12a to the airbag housing 1 and the inflator 3, such that the airbag 10 is coupled to the inflator 3.

Figure 4:
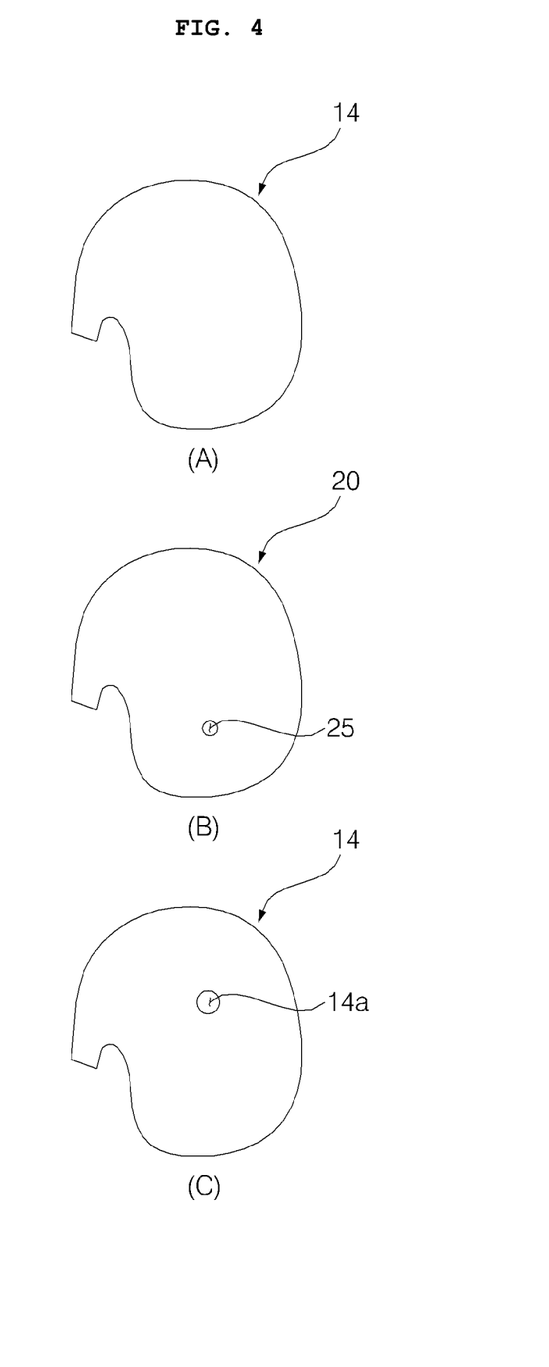
FIG. 4 is a view illustrating side panels illustrated in FIG. 1 and a partition wall.

FIG. 4 is a view illustrating side panels illustrated in FIG. 1 and the partition wall.

Referring to FIG. 4, the partition wall 20 is formed to have the same shape and the same size as the side panels 14 that define both lateral surfaces of the airbag 10, respectively. FIG. 4A illustrates a left side panel 14 that covers the opened left side of the main panel 12, has a circumference coupled to the main panel 12, and defines one surface of the second expandable portion 10B, FIG. 4B illustrates the partition wall 20, and FIG. 4C illustrates a right side panel 14 that covers the opened right side of the main panel 12, has a circumference coupled to the main panel 12, and defines one surface of the first expandable portion 10A. Referring to FIG. 4B, it can be seen that the communicating hole 25 is formed in the partition wall 20.

Meanwhile, referring to FIG. 4C, it can be seen that a vent hole 14a is formed in the right side panel 14. Gas flowing into the first expandable portion 10A is discharged to the outside of the airbag 10 through the vent hole 14a. Since gas generated by the inflator 3 is high-pressure gas, pressure in the first expandable portion 10A is prevented from being excessively increased by discharging gas flowing into the first expandable portion 10A to the outside of the airbag 10 through the vent hole 14a, thereby preventing the upper body of the occupant from being injured by deployment pressure of the first expandable portion 10A when the upper body of the occupant comes into contact with the first expandable portion 10A.

Figure 5:
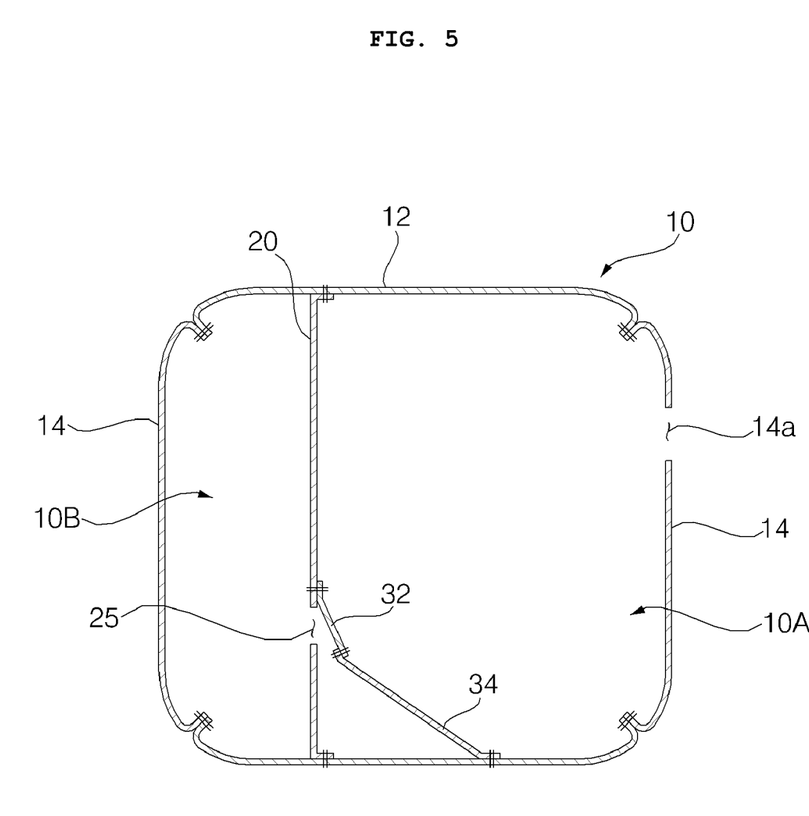
FIG. 5 is a cross-sectional view of the airbag illustrated in FIG. 1 when viewed from the front side.

FIG. 5 is a cross-sectional view of the airbag illustrated in FIG. 1 when viewed from the front side.

Referring to FIG. 5, the partition wall 20 divides the airbag 10 in the left and right direction so that the first expandable portion 10A has a larger volume than the second expandable portion 10B. The first expandable portion 10A is a portion that performs a basic function of the airbag 10 for protecting the occupant using cushioning force, and the second expandable portion 10B is a portion that performs a function of preventing the head of the occupant, which is in contact with the first expandable portion 10A, from deviating from the airbag 10 while sliding toward one side. Therefore, the first expandable portion 10A may have a larger volume so that the first expandable portion 10A may perform the basic function of the airbag 10.

Only one communicating hole 25 is formed in the partition wall 20. In this case, only one vent cover 32 and only one tether 34 are provided. When the vent cover 32 is coupled to the partition wall 20 by sewing, only the upper end of the vent cover 32 is securely sewed, and the remaining portions of the vent cover 32 are sewed so that the tether 34 may be separated from the vent cover 32 by force that pulls the vent cover 32. Further, one end of the tether 34 may be coupled to the lower end of the vent cover 32 by sewing, and the other end of the tether 34 may be coupled to the main panel 12, that is, a lower surface in the first expandable portion 10A.

An operation of the airbag apparatus according to the first exemplary embodiment of the present invention, which is configured as described above, will be described below.

Figure 6:
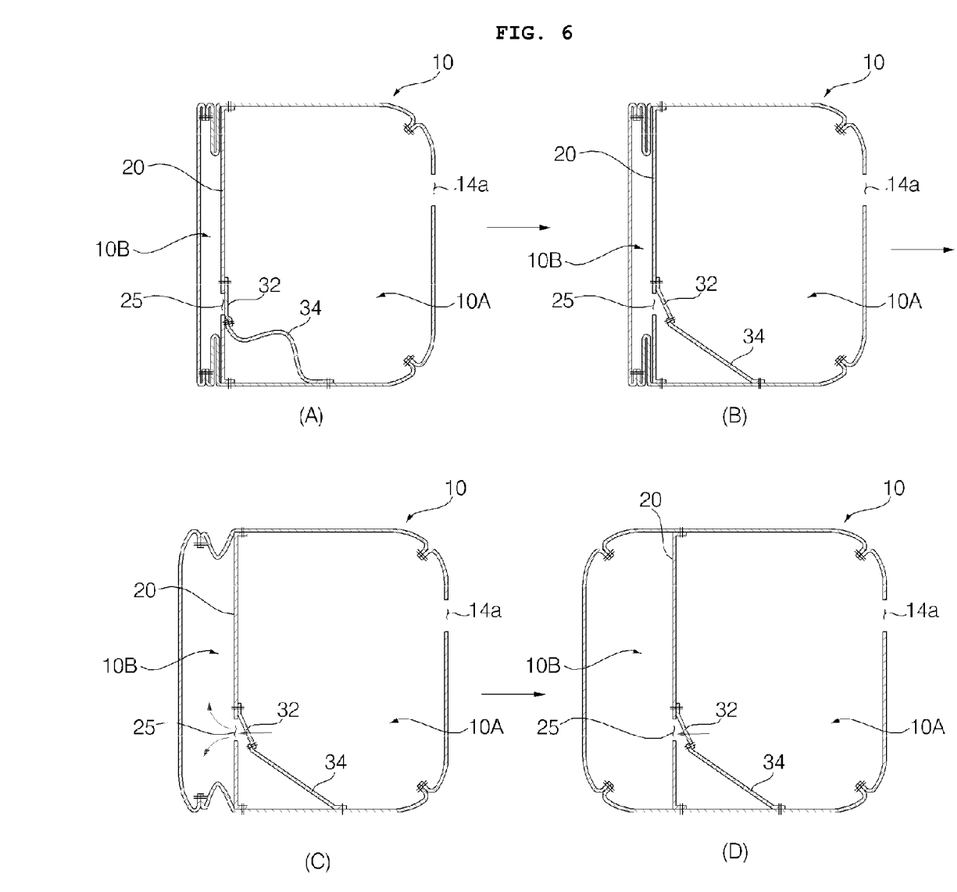
FIG. 6 is a view illustrating a sequence of operating the airbag apparatus according to the first exemplary embodiment of the present invention.

FIG. 6 is a view illustrating a sequence of operating the airbag apparatus according to the first exemplary embodiment of the present invention.

Referring to FIG. 6A, when gas generated by the inflator 3 begins to be injected into the first expandable portion 10A, the first expandable portion 10A begins to be inflated by the gas injected by the inflator 3. Since the tether 34 is in a loosened state at a point of time at which the first expandable portion 10A begins to be inflated as described above, the vent cover 32 maintains a shielded state of the communicating hole 25.

Referring to FIG. 6B, as the first expandable portion 10A is inflated, the tether 34 gradually becomes tightened while moving along the first expandable portion 10A and pulls the vent cover 32. Therefore, as the vent cover 32 is pulled by the tether 34, the lower end of the vent cover 32 is separated from the partition wall 20, thereby opening the communicating hole 25.

Referring to FIGS. 6C and 6D, when the communicating hole 25 is opened, gas in the first expandable portion 10A is discharged into the second expandable portion 10B through the communicating hole 25. Therefore, the second expandable portion 10B begins to be inflated by gas that is discharged through the communicating hole 25 from the first expandable portion 10A, and is inflated until pressure in the second expandable portion 10B becomes equal to pressure in the first expandable portion 10A.

Figure 7:
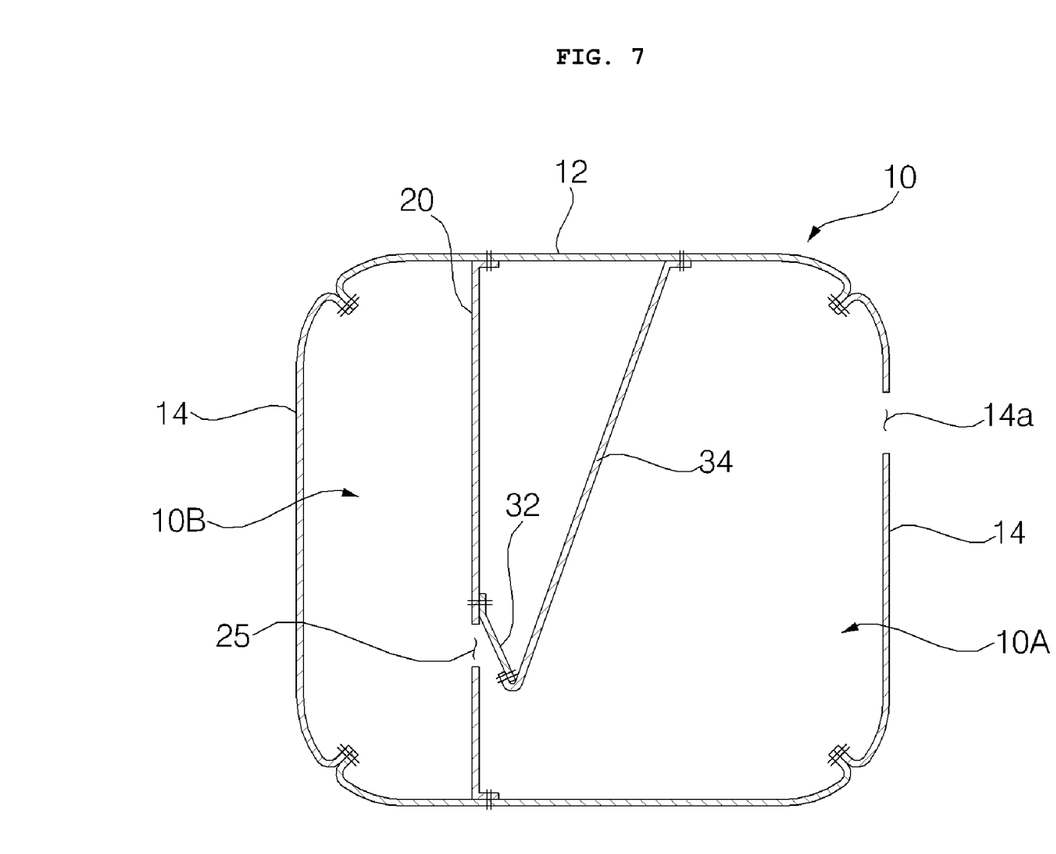
FIG. 7 is a cross-sectional view of an airbag of an airbag apparatus according to a second exemplary embodiment of the present invention when viewed from the front side.

FIG. 7 is a cross-sectional view of an airbag of an airbag apparatus according to a second exemplary embodiment of the present invention when viewed from the front side. Hereinafter, like reference numerals refer to constituent elements identical to those of the aforementioned first exemplary embodiment, a detailed description thereof will be omitted, and only the differences between the exemplary embodiments will be described.

Referring to FIG. 7, it can be seen that the airbag apparatus according to the second exemplary embodiment of the present invention differs from the airbag apparatus illustrated in FIG. 6 according to the aforementioned first exemplary embodiment. That is, in the aforementioned first exemplary embodiment, the one end of the tether 34 is coupled to the lower end of the vent cover 32, and the other end of the tether 34 is coupled to the main panel 12, that is, the lower surface in the first expandable portion 10A, but in the present second exemplary embodiment, the one end of the tether 34 is coupled to the lower end of the vent cover 32, and the other end of the tether 34 is coupled to the main panel 12, that is, an upper surface in the first expandable portion 10A.

The one end of the tether 34 is coupled to the lower end of the vent cover 32 as described in the aforementioned first exemplary embodiment, but the one end of the tether 34 may be coupled to an upper end of the vent cover 32. Further, the other end of the tether 34 may be coupled to the side panel 14, that is, one surface of the first expandable portion 10A.

Figure 8:
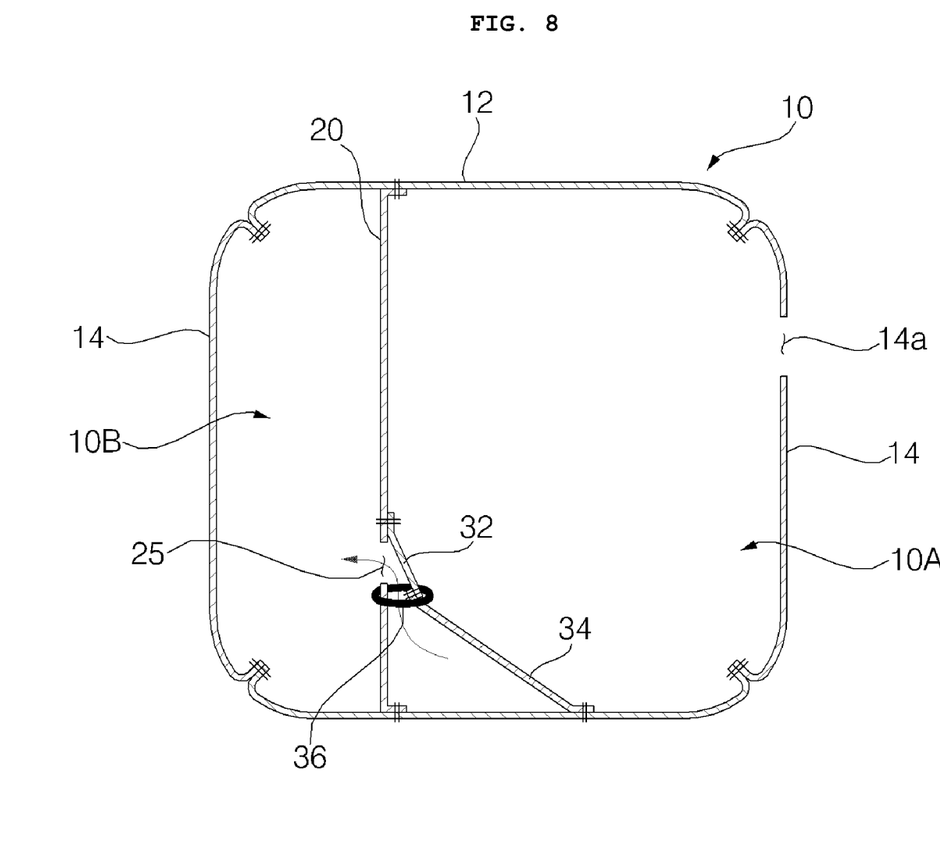
FIG. 8 is a cross-sectional view of an airbag of an airbag apparatus according to a third exemplary embodiment of the present invention when viewed from the front side.

FIG. 8 is a cross-sectional view of an airbag of an airbag apparatus according to a third exemplary embodiment of the present invention when viewed from the front side. Hereinafter, like reference numerals refer to constituent elements identical to those of the aforementioned first exemplary embodiment, a detailed description thereof will be omitted, and only the differences between the exemplary embodiments will be described.

Referring to FIG. 8, it can be seen that the airbag apparatus according to the third exemplary embodiment of the present invention differs from the airbag apparatus illustrated in FIG. 6 according to the aforementioned first exemplary embodiment. That is, unlike the aforementioned first exemplary embodiment, the airbag apparatus according to the third exemplary embodiment of the present invention further includes an elastic member 36. The elastic member 36 is coupled to the partition wall 20 and the vent cover 32 and pulls the vent cover 32 in a direction in which the vent cover 32 shields the communicating hole 25. Therefore, when the vent cover 32 is not pulled by the tether 34, a shielded state of the communicating hole 25 may be maintained. The elastic member 36 is formed in a ring shape, and the tether 34 penetrates the elastic member 36.

Meanwhile, the number of communicating holes 25 may be more than one, and the number of vent covers 32 may also be more than one so as to correspond to the number of vent holes 25. Further, the number of tethers 34 and the shape of the tethers 34 may be variously changed, and a coupling position of the tether 34 may be variously changed. This configuration will be described with reference to a fourth exemplary embodiment and the exemplary embodiment illustrated in FIG. 5.

Figure 9:
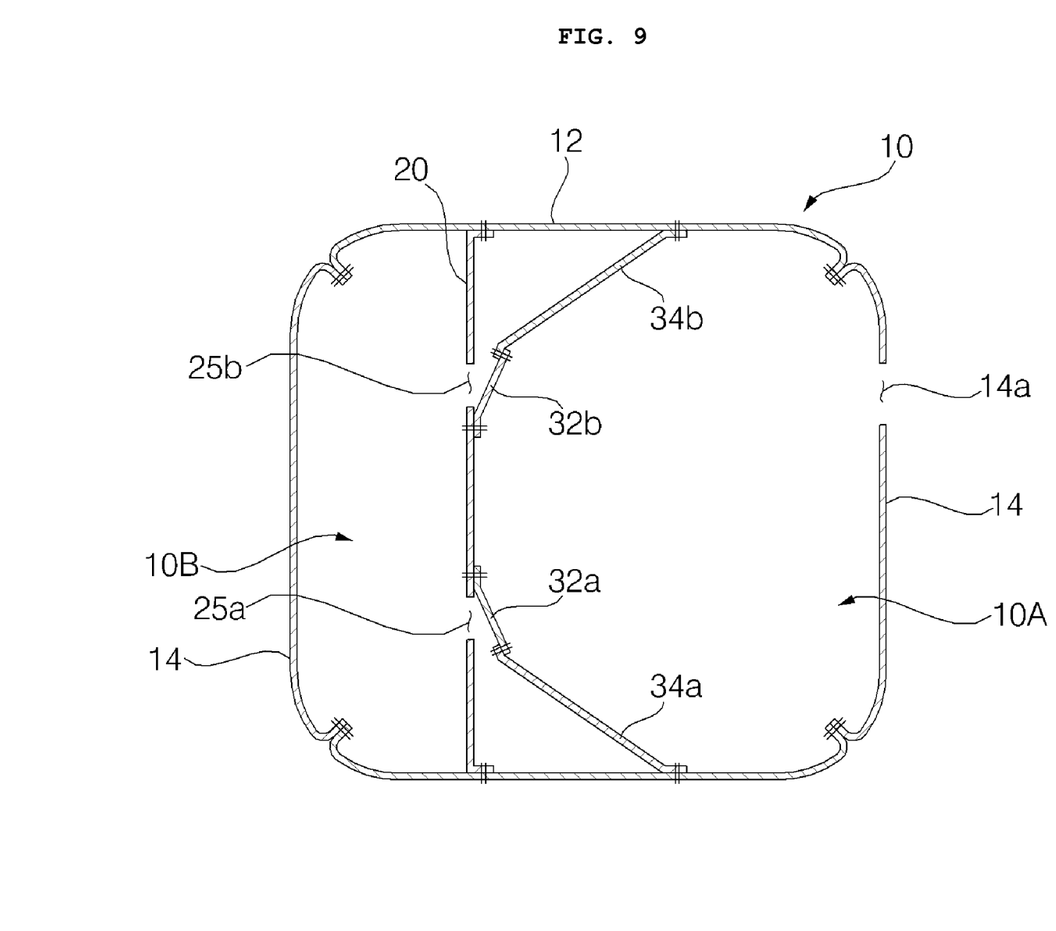
FIG. 9 is a cross-sectional view of an airbag of an airbag apparatus according to a fourth exemplary embodiment of the present invention when viewed from the front side.

FIG. 9 is a cross-sectional view of an airbag of an airbag apparatus according to a fourth exemplary embodiment of the present invention when viewed from the front side. Hereinafter, like reference numerals refer to constituent elements identical to those of the aforementioned first exemplary embodiment, a detailed description thereof will be omitted, and only the differences between the exemplary embodiments will be described.

Referring to FIG. 9, it can be seen that the airbag apparatus according to the fourth exemplary embodiment of the present invention differs from the airbag apparatus illustrated in FIG. 6 according to the aforementioned first exemplary embodiment. That is, unlike the aforementioned first exemplary embodiment, in the airbag apparatus according to the fourth exemplary embodiment of the present invention, a plurality of communicating holes 25a and 25b is formed in the partition wall 20.

Two communicating holes 25a and 25b are formed and include a first communicating hole 25a and a second communicating hole 25b.

A plurality of vent covers 32a and 32b is provided. Two vent covers 32a and 32b are provided and include a first vent cover 32a which is coupled to the partition wall 20 and shields the first communicating hole 25a, and a second vent cover 32b which is coupled to the partition wall 20 and shields the second communicating hole 25b.

A plurality of tethers 34a and 34b is provided. Two tethers 34a and 34b are provided and include a first tether 34a which is coupled to the first vent cover 32a and the first expandable portion 10A, and a second tether 34b which is coupled to the second vent cover 32b and the first expandable portion 10A. One end of the first tether 34a is coupled to the first vent cover 32a, and the other end of the first tether 34a is coupled to the main panel 12, that is, a lower surface in the first expandable portion 10A. One end of the second tether 34b is coupled to the second vent cover 32b, and the other end of the second tether 34b is coupled to the main panel 12, that is, an upper surface in the second expandable portion 10B.

Figure 10:
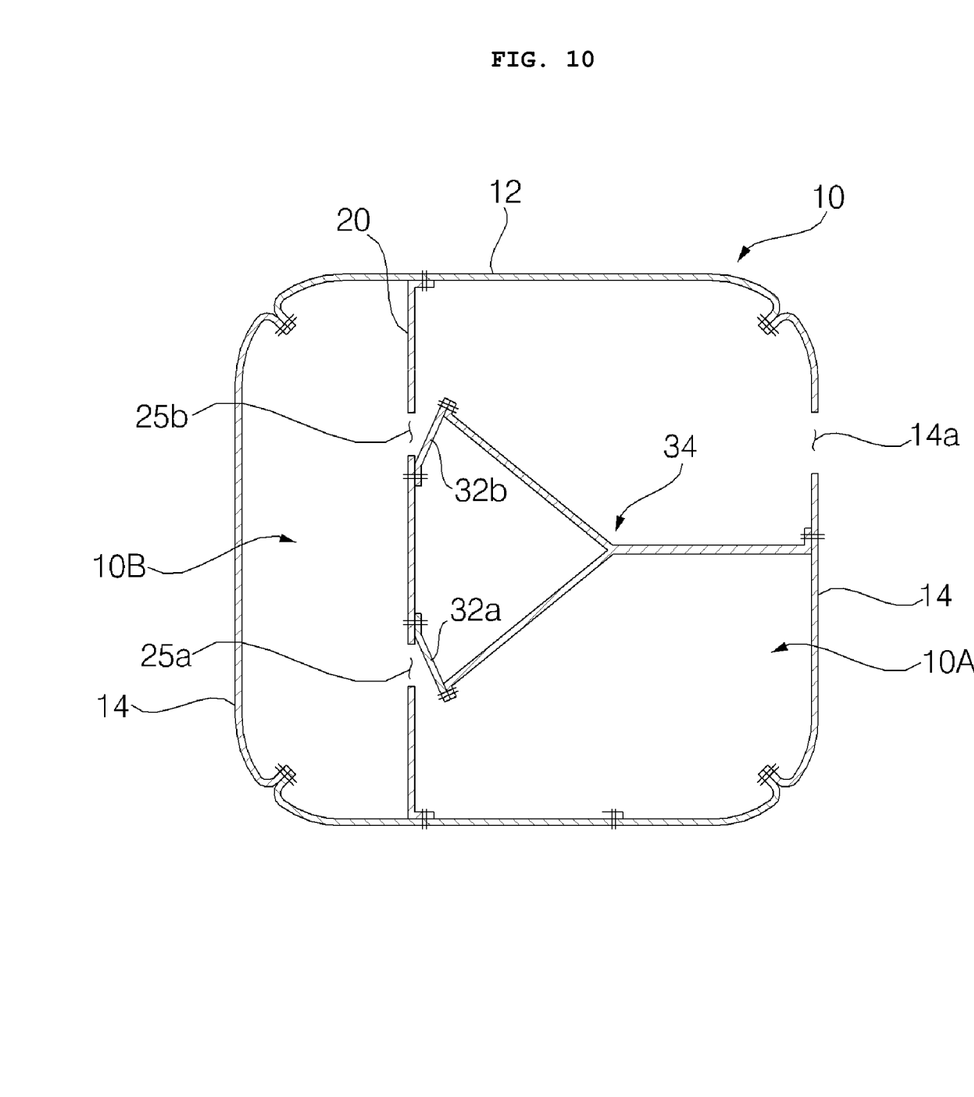
FIG. 10 is a cross-sectional view of an airbag of an airbag apparatus according to a fifth exemplary embodiment of the present invention when viewed from the front side.

FIG. 10 is a cross-sectional view of an airbag of an airbag apparatus according to a fifth exemplary embodiment of the present invention when viewed from the front side. Hereinafter, like reference numerals refer to constituent elements identical to those of the aforementioned first exemplary embodiment, a detailed description thereof will be omitted, and only the differences between the exemplary embodiments will be described.

Referring to FIG. 10, it can be seen that the airbag apparatus according to the fifth exemplary embodiment of the present invention differs from the airbag apparatus illustrated in FIG. 6 according to the aforementioned first exemplary embodiment. That is, unlike the aforementioned first exemplary embodiment, in the airbag apparatus according to the fifth exemplary embodiment of the present invention, a plurality of communicating holes 25a and 25b is formed in the partition wall 20.

Two communicating holes 25a and 25b are formed and include a first communicating hole 25a and a second communicating hole 25b.

A plurality of vent covers 32a and 32b is provided. Two vent covers 32a and 32b are provided and include a first vent cover 32a which is coupled to the partition wall 20 and shields the first communicating hole 25a, and a second vent cover 32b which is coupled to the partition wall 20 and shields the second communicating hole 25b.

Meanwhile, like the aforementioned first exemplary embodiment, a single tether 34 is provided. However, in the case of the tether 34 according to the present fifth exemplary embodiment, ends of a plurality of portions which branches off from the tether 34 are coupled to the first vent cover 32a and the second vent cover 32b, respectively, and the other end of the tether 34 is coupled to the side panel 14, that is, a lateral surface in the first expandable portion 10A.

In the fourth and fifth exemplary embodiments as described above, the plurality of communicating holes 25a and 25b is formed in the partition wall 20, and the plurality of vent covers 32a and 32b is coupled to the partition wall 20 and shields the plurality of communicating holes 25a and 25b, respectively. Further, at least one tether 34, 34a, or 34b is provided and pulls the plurality of vent covers 32a and 32b while being tightened as the first expandable portion 10A is inflated, so that the plurality of vent covers 32a and 32b shields the plurality of communicating holes 25a and 25b.

According to the airbag apparatus according to the exemplary embodiments of the present invention as described above, in a case in which the vehicle collides with an object at the front side with respect to a direction in which the vehicle travels, the upper body of the occupant is protected while coming into contact with the first expandable portion 10A of the airbag 10. In addition, in a case in which the vehicle collides with an object obliquely with respect to the direction in which the vehicle travels, the upper body of the occupant comes into contact with the first expandable portion 10A of the airbag 10 and then comes into contact with the second expandable portion 10B of the airbag 10 while sliding toward one side, and as a result, the upper body of the occupant does not deviate from the airbag 10.

It may be understood by a person skilled in the art that the present invention may be carried out in other specific forms without changing the technical spirit or the essential characteristics. Thus, it should be appreciated that the exemplary embodiments described above are intended to be illustrative in every sense, and not restrictive. The scope of the present invention is represented by the claims to be described below rather than the detailed description, and it should be interpreted that all the changes or modified forms, which are derived from the meaning and the scope of the claims, and the equivalents thereto, are included in the scope of the present invention.

What is claimed is:

1. An airbag apparatus comprising:
an inflator which generates gas;
an airbag which has a first expandable portion that is coupled to the inflator and inflated when gas flows into the first expandable portion, and a second expandable portion that is inflated by gas discharged from the first expandable portion;
a partition wall which is disposed in the airbag to divide the airbag in a left and right direction into the first expandable portion and the second expandable portion, and has at least one communicating hole through which gas in the first expandable portion is discharged into the second expandable portion; and
a vent rate adjusting member which shields the at least one communicating hole, and opens the at least one communicating hole as the first expandable portion is inflated,
wherein the vent rate adjusting member comprises:
at least one vent cover which is coupled to the partition wall and shields the at least one communicating hole; and
at least one tether which is coupled to the at least one vent cover and the first expandable portion and pulls the at least one vent cover while being tightened as the first expandable portion is inflated, such that the at least one vent cover opens the at least one communicating hole.

2. The airbag apparatus of claim 1, wherein the at least one communicating hole comprises a plurality of communicating holes formed in the partition wall, the at least one vent cover comprises a plurality of vent covers is provided to shield the plurality of communicating holes, respectively, and coupled to the partition wall, and the at least one tether is provided and pulls the plurality of vent covers while being tightened as the first expandable portion is inflated, such that the plurality of vent covers shields the plurality of communicating holes.

3. The airbag apparatus of claim 2, wherein the plurality of communicating holes includes a first communicating hole and a second communicating hole, the plurality of vent covers includes a first vent cover which is coupled to the partition wall and shields the first communicating hole, and a second vent cover which is coupled to the partition wall and shields the second communicating hole, and the at least one tether includes a first tether coupled to the first vent cover and the first expandable portion, and a second tether coupled to the second vent cover and the first expandable portion.

4. The airbag apparatus of claim 2, wherein the plurality of communicating holes includes a first communicating hole and a second communicating hole, the plurality of vent covers includes a first vent cover which is coupled to the partition wall and shields the first communicating hole, and a second vent cover which is coupled to the partition wall and shields the second communicating hole, and the at least one tether has a plurality of portions, which branches off from the tether and has ends that are coupled to the first vent cover and the second vent cover, respectively, and the other end of the tether is coupled to the first expandable portion.

5. The airbag apparatus of claim 1, further comprising:
an elastic member which is coupled to the partition wall and the at least one vent cover and pulls the at least one vent cover in a direction in which the vent cover shields the communicating hole.

6. The airbag apparatus of claim 5, wherein the elastic member is formed in a ring shape, and the at least one tether penetrates the elastic member.

7. The airbag apparatus of claim 1, wherein the airbag includes a main panel to which the inflator is coupled and is configured for an occupant to come into contact with, and side panels which are coupled at both sides of the main panel, respectively, and the partition wall is disposed between the side panels at both sides and coupled to the main panel.

8. The airbag apparatus of claim 7, wherein the partition wall has the same shape and the same size as the side panels at both sides.

9. The airbag apparatus of claim 1, wherein a vent hole through which gas in the first expandable portion is discharged to the outside of the airbag is formed in one surface of the first expandable portion.

10. The airbag apparatus of claim 1, wherein the first expandable portion has a larger volume than the second expandable portion.

11. The airbag apparatus of claim 1, wherein the first expandable portion is disposed to be closer to the outside from the interior of a vehicle between the left and right sides than the second expandable portion, and disposed at a position corresponding to an occupant seated in a seat.

\* \* \* \* \*